A. C & W. W. OLANDER.
FASTENING DEVICE.
APPLICATION FILED DEC. 23, 1908.
944,461.
Patented Dec. 28, 1909.
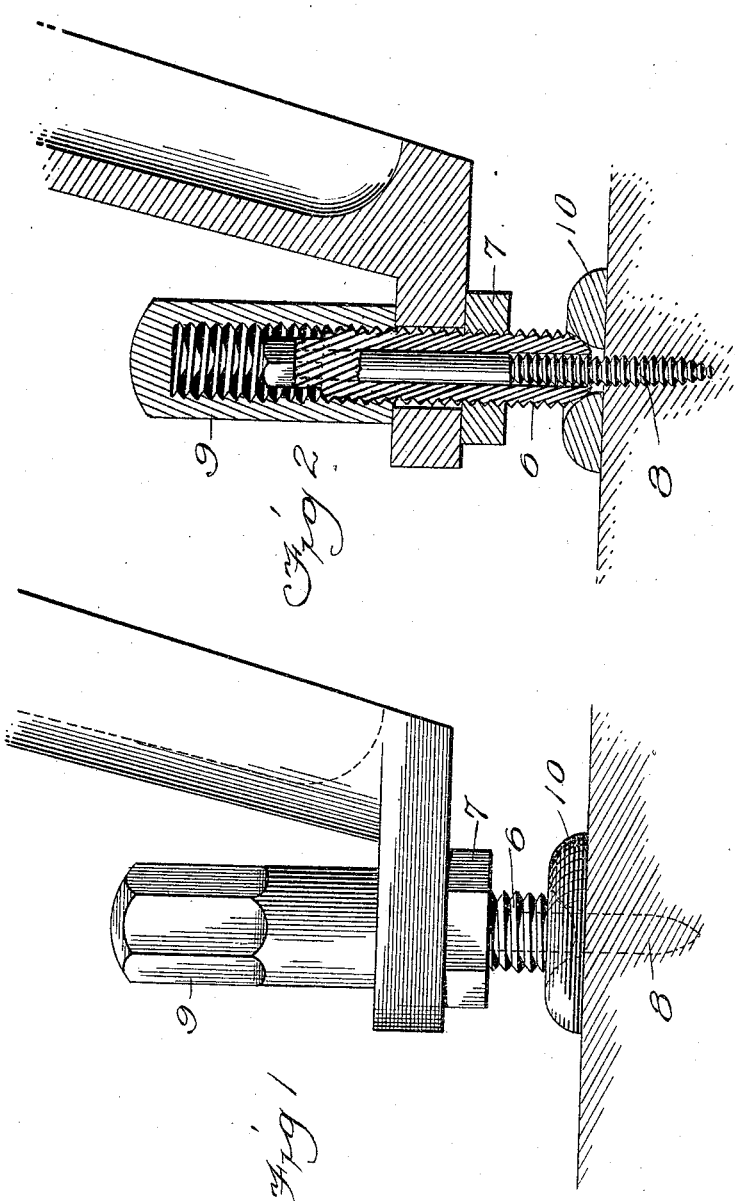
Inventors
A. C. Olander.
W. W. Olander.

UNITED STATES PATENT OFFICE.

ALDEN C. OLANDER, OF MINOT, NORTH DAKOTA, AND WALTER W. OLANDER, OF WATERVILLE, IOWA.

FASTENING DEVICE.

944,461.  Specification of Letters Patent.   Patented Dec. 28, 1909.

Application filed December 23, 1908.  Serial No. 469,017.

*To all whom it may concern:*

Be it known that we, ALDEN C. OLANDER and WALTER W. OLANDER, citizens of the United States, residing at Minot, in the county of Ward and State of North Dakota, and Waterville, Iowa, respectively, have invented certain new and useful Improvements in Fastening Devices, of which the following is a specification.

This invention is a fastening device particularly adapted for holding the legs of machines to floors, hangers to ceilings, and the like.

The object of the invention is to provide a device of the kind stated which can be adjusted to various positions for the purpose of leveling the machines or accommodating the same to inequalities in the floor or surface to which it is applied.

The invention is illustrated in the accompanying drawings in which—

Figure 1 is a side view illustrating the application of the device to the leg of a machine; Fig. 2 is a longitudinal section.

Referring specifically to the drawings, 6 indicates a hollow externally-threaded part which is adapted to extend through a hole in the foot of the machine, and it receives a nut 7 on which the foot of the machine rests. The lower end of the part 6 is rounded to fit in a depression in the top of a washer 10, which rests upon the floor. A long screw 8 extends through the sleeve 6 and the washer and is adapted to screw into the floor to hold the fastening in position. The sleeve 6 and the screw 8 are headed to receive a wrench whereby they may be set in proper position, or removed, as desired. The sleeve 6 receives an internally-threaded cap 9.

In the use of the device the sleeve 6 is inserted through the foot of the machine and the washer placed on the floor under the same. The screw 8 is then inserted and screwed into the floor. The nut 7 is adjusted up or down to raise or lower the foot of the machine to desired position, after which the cap 9 is put on and screwed down tight upon the foot of the machine thereby holding the same firmly in position.

The device will be found very useful in setting up and leveling machines of all kinds; for attaching brackets, shaft hangers, and the like. The rounded lower end of the sleeve 6 and the corresponding depression in the washer 10 permit the washer to accommodate itself to any inequalities or unevenness in the floor.

We claim:

1. A fastening comprising an externally-threaded sleeve, a threaded pin extending through the sleeve and adapted to screw into the floor, a washer on which the lower end of the sleeve rests, and adjustable nuts on the sleeve, for clamping the article to be held.

2. The combination of a threaded pin adapted to screw into a floor or the like, a washer on the pin to rest against the floor, an externally-threaded sleeve fitting over the pin and having a rounded foot resting upon the washer, and clamping nuts upon the upper part of the sleeve.

3. The combination of a headed pin adapted to screw into a floor or the like, an externally-threaded sleeve fitting upon said pin, an adjustable nut on the sleeve, and a threaded cap adapted to fit upon the upper end of the sleeve and to clamp an article against the nut.

In testimony whereof, we affix our signatures in presence of two witnesses.

ALDEN C. OLANDER.
WALTER W. OLANDER.

Witnesses to Alden C. Olander:
 J. A. McGREGOR,
 R. R. McGREGOR.
Witnesses to Walter W. Olander:
 C. A. WALLIN,
 N. B. OLANDER.